United States Patent
Sigworth et al.

(10) Patent No.: US 6,939,903 B2
(45) Date of Patent: Sep. 6, 2005

(54) NATURAL FIBER-FILLED POLYOLEFIN COMPOSITES

(75) Inventors: William D. Sigworth, Naugatuck, CT (US); Roger A. Cheney, Naugatuck, CT (US); Louis M. Panzer, Ridgefield, CT (US); Henry L. Mei, New City, NY (US)

(73) Assignee: Crompton Corporation, Middlebury, CT (US)

( * ) Notice: Subject to any disclaimer, the term of this patent is extended or adjusted under 35 U.S.C. 154(b) by 146 days.

(21) Appl. No.: 10/417,031

(22) Filed: Apr. 16, 2003

(65) Prior Publication Data

US 2004/0072924 A1 Apr. 15, 2004

Related U.S. Application Data

(60) Provisional application No. 60/416,962, filed on Oct. 9, 2002.

(51) Int. Cl.$^7$ ................................................ C08K 9/06
(52) U.S. Cl. ...................... 523/200; 523/209; 523/212; 523/213
(58) Field of Search ............................. 523/200, 209, 523/212, 213

(56) References Cited

U.S. PATENT DOCUMENTS

| | | | | | |
|---|---|---|---|---|---|
| 4,317,765 | A | * | 3/1982 | Gaylord | 523/204 |
| 4,717,742 | A | | 1/1988 | Beshay | 523/203 |
| 4,764,546 | A | * | 8/1988 | Mitsuno et al. | 523/213 |
| 4,820,749 | A | | 4/1989 | Beshay | 523/203 |
| 4,868,226 | A | * | 9/1989 | Mitsuno et al. | 523/212 |
| 5,773,138 | A | * | 6/1998 | Seethamraju et al. | 428/326 |
| 6,265,037 | B1 | | 7/2001 | Godavarti et al. | 428/34 |
| 6,300,415 | B1 | | 10/2001 | Okayama et al. | 525/191 |
| 6,632,863 | B2 | * | 10/2003 | Hutchison et al. | 524/13 |
| 2003/0065059 | A1 | | 4/2003 | Krishnaswamy | |

FOREIGN PATENT DOCUMENTS

| | | |
|---|---|---|
| EP | 0540026 A1 | 5/1993 |
| GB | 2205569 A | 12/1988 |
| JP | 2138349 | 5/1990 |

OTHER PUBLICATIONS

Misra, et al. "Role of Silane and Novel Water–Based Hybrid Couplling Agents in Increasing the Adhesion Between Natural Fiber and Polypropylene," Proceedings of the 25th Annual Meeting of the Adhesion Society, Inc. and the WCARP II, (2002), pp 183–6.*

Sigworth, et al. "The Use of FUnctionalized Polyolefins in Environmentally Friendly Plastic Composites," Paper #20, presented at the GPRC 2002, Detroit MI (Feb. 13–14, 2002).*

Kokta, B.V. et al., Use of Wood Flour as Filler in Polypropylene: Studies on Mechanical Properties, Polym.–Plast. Technol. Eng., 28(3): 247–259 (1989).

Raj, R.G. et al., The Influence of Coupling Agents on Mechanical Properties of Composites Containing Cellulosic Fillers, Polym–Plast. Tecnol. Eng., 29(4):339–353 (1990).

Matuana, L.M. et al., Influence of Interfacial Interactions on the Properties of PVC/Cellulosic Fiber Composites, ANTEC vol. 3:3313–3318 (1998).

Misra et al., Role of Silane and Novel Water–Based Hybrid Coupling Agents in Increasing the Adhesion Between Natural Fiber and Polypropylene, Composite Materials & Structures Center, Michigan State University, 2100 Engineering Building, East Lansing, Michigan 48824, vol. 137, No. 24, (2002) (Chemical Abstract).

* cited by examiner

Primary Examiner—Matthew A. Thexton
(74) Attorney, Agent, or Firm—Michael P. Dilworth

(57) ABSTRACT

A process for preparing a composite material is disclosed wherein the process comprises:

A) sizing a natural fiber with a reactive organosilane;
B) mixing the sized natural fiber with a polyolefin resin; and
C) adding a functionalized polyolefin coupling agent to the mixture of the sized natural fiber and the polyolefin resin to provide said composite material.

16 Claims, No Drawings

NATURAL FIBER-FILLED POLYOLEFIN COMPOSITES

We claim the benefit under Title 35, United States Code, § 120 of U.S. Provisional Application No. 60/416,962, filed Oct. 9, 2002, entitled NATURAL FIBER-FILLED POLYOLEFIN COMPOSITES.

BACKGROUND OF THE INVENTION

1. Field of the Invention

The present invention relates to polyolefin composites comprising natural fibers. More particularly, the present invention relates to natural fiber-filled polyolefin composites having improved mechanical properties resulting from the inclusion of a reactive organosilane and a functionalized polyolefin coupling agent during their manufacture.

2. Description of Related Art

It is known in the art to prepare composites comprising thermoplastic resinous matrix materials having dispersed therein organic reinforcing fillers, such as cellulosic or lignocellulosic fibers. It is also known in the art to improve the mechanical properties of such composites by treating such fibers with organosilanes or, alternatively, other coupling agents prior to their introduction into the thermoplastic resinous matrix material.

U.S. Pat. No. 4,717,742 discloses resin composites reinforced with silanes grafted onto organic fillers that are said to have improved durability, even at sub-zero degrees or at high temperatures, improved physical properties and can be prepared by a process, in which the organic filler is grafted with a silane coupling agent in maleated polymer matrix.

U.S. Pat. No. 4,820,749 discloses a composite material based on a polymeric or copolymeric substance which may be a thermoplastic or thermosetting material or rubber, and all organic material which is cellulosic or starch. The cellulosic material is grafted with a silylating agent. Processes for preparing this composite are also disclosed.

U.S. Pat. No. 6,265,037 discloses an improved composite structural member comprising a complex profile structural member, made of a composite comprising a polypropylene polymer and a wood fiber. The material is said to be useful in conventional construction applications.

U.S. Pat. No. 6,300,415 discloses a polypropylene composition for the production of various molded articles which are said to be excellent in moldability, mold shrinkage factor on molding, rigidity, flexibility, impact resistance, in particular low-temperature impact resistance, transparency, gloss, stress-whitening resistance, and the balance thereof; various molded articles having the above properties; a propylene composition which is suitable for a base resin for the polypropylene composition; and a process for the production thereof. The propylene composition comprises a propylene homopolymer and a propylene-ethylene copolymer.

Kokta, B. V. et al., *Polym.-Plast. Technol. Eng.*, 28(3):247–259 (1989) studied the mechanical properties of polypropylene with wood flour. The wood flour was pretreated with polymethylene polyphenylisocyanate and silane coupling agents before adding it to the polymer.

Raj, R. G. et al., *Polym.-Plast. Technol. Eng.*, 29(4):339–353 (1990) filled high density polyethylene with three different cellulosic fibers that had been pretreated with a silane coupling agent/polyisocyanate to improve the adhesion between the fibers and the polymer matrix.

Matuana, L. M. et al. *ANTEC*3:3313–3318 (1998) studied the effect of the surface acid-base properties of plasticized PVC and cellulosic fibers on the mechanical properties of the plastic/cellulosic composite. They modified the surface of the fibers with γ-aminopropyltriethoxysilane, dichlorodiethylsilane, phthalic anhydride, and maleated polypropylene.

The disclosures of the foregoing are incorporated herein by reference in their entirety.

SUMMARY OF THE INVENTION

According to the present invention, the mechanical strength properties of natural fiber-filled polyolefin composites are improved by treating (sizing) the fiber with a reactive organosilane and, then, adding a functionalized polyolefin coupling agent to the polyolefin resin during the mixing of the fiber and polyolefin resin.

More particularly, the present invention is directed to a process for preparing a composite material comprising:

A) sizing a natural fiber with a reactive organosilane;

B) mixing the sized natural fiber with a polyolefin resin; and

C) adding a functionalized polyolefin coupling agent to the mixture of the sized natural fiber and the polyolefin resin to provide said composite material.

In another aspect, the present invention is directed to a composite material prepared by a process comprising:

A) sizing a natural fiber with a reactive organosilane;

B) mixing the sized natural fiber with a polyolefin resin; and

C) adding a functionalized polyolefin coupling agent to the mixture of the sized natural fiber and the polyolefin resin to provide said composite material.

DESCRIPTION OF THE PREFERRED EMBODIMENTS

It is often desirable to increase the strength properties of natural fiber-filled polyolefin composites, e.g., wood-polyolefin composites, for construction and automotive applications. It is known to use functionalized polyolefin coupling agents to increase such strength properties.

It has now been found that by using a natural fiber sized with a reactive organosilane in combination with a functionalized polyolefin in the resin component of the natural fiber-plastic composite synergistic increases in strength properties can be obtained, as compared to formulations using a sized fiber alone or formulations using a coupling agent alone. These improvements allow the use of natural fiber-polyolefin composites in applications, such as deck supports, railing systems, and automotive parts where structural properties are important. It has also been found that the combination of the reactive organosilane sized fiber and the functionalized coupling agent also provides composites having improved long-term durability by reducing water absorption and increasing creep resistance.

As employed herein, the term "natural fiber" means a fiber obtained, directly or indirectly, from a source in nature. Included within the term, but not limited thereto, are wood flour, wood fiber, and agricultural fibers such as wheat straw, flax, hemp, kenaf, nut shells, and rice hulls. Preferably, the natural fiber is selected from the group consisting of starch or cellulosic material such as cotton fibers, wood pulps, stem or vegetable fibers, wood flours, starch, waste papers, cartons, or cellulosic cloth. More preferably, the natural fiber is wood flour, wood fiber, hemp, flax, or kenaf. Wood fiber, in terms of abundance and suitability, can be derived from either soft woods or evergreens or from hard woods commonly known as broadleaf deciduous trees. While soft wood and hard wood are preferably the primary sources of fiber for the invention, additional fiber make-up can be derived from a number of secondary or fiber reclaim sources, including hard woods, bamboo, rice, sugar cane, and recycled fibers from newspapers, boxes, computer printouts, and the like. However, the primary source for wood fiber used in the process of this invention comprises the wood fiber by-product of sawing or milling softwoods and hardwoods commonly known as sawdust or milling tailings. Fiber levels in the range of from about 20 to about 85 weight % can be used. Fiber levels in the range of from about 30 to about 80 weight % are preferred. Fiber levels in the range of from about 40 to about 70 weight % are most preferred.

The polyolefins employed in the practice of the present invention are typically polymerized from ethylene, propylene, and/or other alpha olefins. Where ethylene is used, it can be, for example, HDPE, LDPE, or LLDPE. Polypropylene homopolymer, as well as copolymers and terpolymers containing ethylene, propylene, and/or other alpha olefins, and/or non-conjugated dienes can also be advantageously employed, as can blends of these polymers.

Thus, the polyolefin materials of the invention can, if desired, comprise a polypropylene copolymer wherein the polymer comprises a major proportion of propylene combined with a minor proportion (typically less than 50 wt %, more commonly between about 0.1 and 10 wt %) of a second monomer that can comprise ethylene or a $C_4$–$C_{16}$ monomer material. Such copolymers often have improved processability, flexibility, and compatibility.

Preferred ethylene copolymers can comprise a major proportion of ethylene and a minor proportion (typically less than 50 wt %, preferably about 0.1 to about 10 wt %) of a $C_3$–$C_{18}$ monomer.

Polypropylene homopolymer and HDPE, i.e., high density polyethylene, are most preferred for use in the practice of the present invention.

The functionalized polyolefin, which is preferably a modified polyethylene or polypropylene, is one that contains reactive groups that can react with a functional group on a reactive organosilane. Such polymers are modified by a reactive group including at least one polar monomer selected from the group consisting of ethylenically unsaturated carboxylic acids or ethylenically unsaturated carboxylic acid anhydrides. Mixtures of the acids and anhydrides, as well as their derivatives, can also be used. Examples of the acids include maleic acid, fumaric acid, itaconic acid, crotonic acid, acrylic acid, methacrylic acid, maleic anhydride, itaconic anhydride, and substituted maleic anhydrides. Maleic anhydride is preferred. Derivatives that may also be used include salts, amides, imides, and esters. Examples of these include, glycidyl methacrylate, mono- and disodium maleate, and acrylamide. Virtually any olefinically reactive residue that can provide a reactive functional group on a modified polyolefin polymer can be useful in the invention. Preferably, such compatibilizers comprise a polyolefin, such as a polyethylene or polypropylene, having a weight average molecular weight (by GPC) that ranges from about 2000 to about 400,000. Each polymer of the compatibilizing agent can be modified with from about 0.1 to about 800 residues per mole of the polymer. Preferred compatibilizers comprise either a modified polypropylene or a modified polyethylene modified with maleic anhydride residues. The most preferred compatibilizers are maleic anhydride modified polypropylenes and maleic anhydride modified high density polyethylenes. The preferred materials have a weight average molecular weight (by GPC) that ranges from about 20,000 to about 300,000 and have from about 0.6 to 310 moles of maleic anhydride per mole of polymer. A good example of a functionalized polyolefin is Polybond 3200, a maleic anhydride functionalized polypropylene, available from Crompton Plastics Additives Division. Functionalized polyolefin levels of 0.5 to 10% based on the total formulation weight can be used1 with levels of 1–5% being preferred.

Any organosilane that is capable of reacting with both the functional groups on the surface of the natural fiber and the reactive site on the functionalized polyolefin can be employed in the practice of the present invention. For example, organosilanes, such as aminosilanes, epoxysilanes, alkoxysilanes, methacrylic silanes, mercaptosilanes, chlorosilanes, and their oligomers, as well as mixtures and blends thereof, can be used. Preferred organosilanes include γ-aminopropyltriethoxysilane, γ-methacryloxypropyl trimethoxysilane, and propyl triethoxy silane. However, this invention is not limited to such silanes. They may advantageously be replaced by other kinds or other weight ratios of silylating agents, for example, vinyltriethoxysilane, vinyltri (2-methoxy-ethoxy)silane, β-(3,4-epoxycyclohexyl)-ethyltrimethoxysilane, γ-glycidoxypropyltrimethoxysilane, γ-mercaptopropyltrimethoxysilane, γ-aminopropyltriethoxysilane, n-β-(aminoethyl)-γ-aminopropyltrimethoxysilane, n-β-(aminoethoxyl)-γ-aminopropyltrimethoxysilane and γ-chloropropyltrimethoxysilane or any other silylating agent having the general formula

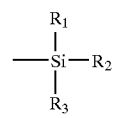

or an oligomer thereof, wherein $R_1$, $R_2$ and $R_3$ are the same or different and are selected from the group consisting of alkoxy, alkyl, alkenyl, cycloalkyl, aryl, aralkyl, and organofunctional moieties.

The most preferred organosilane for use in the practice of the present invention is γ-aminopropyltriethoxysilane, e.g., OSi A-1100. Other silanes can, of course, be used depending on the resin and fibers selected. Carriers, both liquid and solid, can be used in addition to the silanes to aid in the functionalization of the fibers and synergistic improvements enjoyed when used with functionalized polyolefins. Treatment levels can range from about 0.05 to about 3.5% by weight of the fiber with the preferred range generally between about 0.1 and about 2.0% by weight.

In a preferred embodiment, the natural fiber is first treated with 1.0–1.5% aminosilane. The treatment can be either with a direct silane addition to the fibers using an appropriate mixing device or with appropriate carrier or diluent technology, followed by appropriate mixing and drying of the fibers. The treated fiber is then blended with a powdered polypropylene resin and Polybond 3200 coupling agent. The blended ingredients are fed into the main hopper of a 30 mm Coperion twin screw extruder. A strand of the compounded product is cooled in a water bath and pelletized.

EXAMPLE 1

The above method was used to generate the data appearing in column D of Table I below after drying the pellets overnight at 100° C. and injection molding them to make the specimens for mechanical property testing.

TABLE I

Comparison of Methods for Improving Properties of Wood Flour-Filled Polypropylene

| Description | A Control | B MA-PP | C Aminosilane | D Aminosilane + MA-PP |
|---|---|---|---|---|
| 4020 Wood Flour | 50 | 50 | | |
| 4020 Wood Flour + A-1100 | | | 50 | 50 |
| Naugard B-25 | 0.125 | 0.125 | 0.125 | 0.125 |
| PB 3200 | | 2 | | 2 |
| Fortilene HB9200 (4MF) | 49.875 | 47.875 | 49.875 | 47.975 |
| Specific Gravity Unaged | 1.069 | 1.078 | 1.068 | 1.083 |
| Tensile Properties | | | | |
| Peak Stress, MPa | 28.4 | 34.7 | 30.1 | 44.4 |
| % Change vs. Control | 100 | 122 | 106 | 156 |
| Flexural Properties | | | | |
| Modulus, MPa | 4777 | 4835 | 4835 | 5284 |
| % Change vs. Control | 100 | 101 | 101 | 111 |
| Strength, MPa | 45.4 | 57.5 | 47.5 | 70.2 |
| % Change vs. Control | 100 | 127 | 105 | 155 |
| Impact | | | | |
| Reversed Notch Izod, J/m | 64.3 | 70.8 | 61.9 | 78.0 |
| % Change vs. Control | 100 | 110 | 96 | 121 |
| Unnotched Charpy, J/m | 133 | 132 | 140 | 153 |
| % Change vs. Control | 100 | 99 | 105 | 115 |

4020 Wood Flour is a 40 mesh soft wood fiber commercially available for American Wood Fibers, Inc.

Naugard B-25 is a blend of phenolic and phosphite antioxidants. It is added for process stability and is commercially available from Crompton Corporation, Middlebury, Conn.

Fortilene HB 9200 is a homopolymer polypropylene with an MFR of 4 and 230° C. and 2.16 kg and a density of 0.900 gm/cc. It is commercially available from BP Amoco Chemical Company, Naperville, Ill.

In the above table, tensile properties were measured per ASTM procedure D638, while flexural modulus and strength were obtained using D790. Impact testing followed D256.

EXAMPLE 2

Example 1 was repeated except that 40 parts of hemp were substituted for the 50 parts of wood flour employed therein. The results are shown in Table II.

TABLE II

40% Hemp-Filled Polypropylene
Effect of Fiber Sizing and Coupling Agents

| Sample | A | B | C | D |
|---|---|---|---|---|
| Hemp-Untreated | 40 | 40 | | |
| Hemp treated with A-1100 | | | 40 | 40 |
| Naugard B-25 | 0.15 | 0.15 | 0.15 | 0.15 |
| Polybond 3200 | | 2 | | 2 |
| Fortilene HB-9200 Mixed in Brabender and Compression Molded | 59.85 | 57.85 | 59.85 | 57.85 |
| Specific Gravity Unaged | 1.070 | 1.068 | 1.064 | 1.070 |
| Flexural Properties | | | | |
| Modulus, MPa | 4042 | 4249 | 3940 | 4374 |
| *Change vs. Control | 100% | 105% | 97% | 108% |
| Strength, MPa | 52.0 | 72.2 | 53.1 | 78.4 |
| *Change vs. Control | 100% | 139% | 102% | 151% |

Alternative processing approaches could be used in the practice of the present invention that would be equally effective. In most production facilities, the natural fiber is dried either prior to addition to the extruder or in the extruder prior to mixing with the resin. In the former case, the reactive organosilane can be sprayed onto the fiber as it enters the dryer. An example of equipment that could be used in the latter case is the Davis-Standard Woodtruder®. In this extrusion equipment, the reactive organosilane could be sprayed onto the natural fiber during the drying process. This approach would have the added advantage of reducing fiber dust, a major problem with this operation.

The reactive organosilane could also be adsorbed on the surface of a polymeric carrier and introduced with the resin and functionalized polyolefin during the compounding step. Suitable carriers include polyolefin resins or functionalized polyolefin products, which are available as small, porous beads (so called reactor flakes or beads).

Additionally, the silane could also be added directly to the extrusion or compounding process. In one example of this approach, the liquid silane could be metered into a twin screw extruder at a liquid injection port using any of a number of different pumping devices. Experience has taught that the injection point should be located in the upstream section of the extruder subsequent to the main feeder where the resin and natural fiber are added. Injection should also be made in a conveying section of the extruder screw prior to the distributive and dispersive mixing elements and that a vacuum port is required downstream to vent off any volatiles generated by the reaction of the organosilane with the natural fiber. The coupling agent may be added downstream of the organosilane or with the resin and natural fiber in the main feeder.

In view of the many changes and modifications that can be made without departing from principles underlying the invention, reference should be made to the appended claims for an understanding of the scope of the protection to be afforded the invention.

What is claimed is:

1. A process for preparing a composite material consisting essentially of the steps of:

A) sizing a natural fiber with a reactive organosilane;
   B) mixing the sized natural fiber with a high density polyethylene resin; and
   C) adding a functionalized polyolefin coupling agent to the mixture of the sized natural fiber and the high density polyethylene resin to provide said composite material;

wherein the functionalized polyolefin coupling agent is selected from the group consisting of maleic anhydride modified polypropylenes having a weight average molecular weight in the range of from about 20,000 to about 300,000 and comprising from about 0.6 to 310 moles of maleic anhydride per mole of polymer and maleic anhydride modified high density polyethylenes having a weight average molecular weight in the range of from about 20,000 to about 300,000 and comprising from about 0.6 to 310 moles of maleic anhydride per mole of polymer.

2. The process of claim 1 wherein the natural fiber is selected from the group consisting of wood flour, wood fiber, and agricultural fiber.

3. The process of claim 2 wherein the natural fiber is selected from the group consisting of wood flour, wood fiber, hemp, flax, and kenaf.

4. The process of claim 1 wherein the natural fiber is employed at a level in the range of from about 20 to about 85 weight % based on the weight of the total formulation.

5. The process of claim 1 wherein the reactive organosilane is selected from the group consisting of aminosilanes, epoxysilanes, alkoxysilanes, methacrylic silanes, mercaptosilanes, chlorosilanes, and oligomers, mixtures, and blends thereof.

6. The process of claim 1 wherein the reactive organosilane is γ-aminopropyltriethoxysilane.

7. The process of claim 1 wherein the reactive organosilane is selected from the group consisting of γ-aminopropyltriethoxysilane, γ-methacryloxypropyl trimethoxysilane, propyl triethoxy silane, vinyltriethoxysilane, vinyltri(2-methoxy-ethoxy)silane, β-(3,4-epoxycyclohexyl)-ethyltrimethoxysilane, γ-glycidoxypropyltrimethoxysilane, γ-mercaptopropyltrimethoxysilane, n-β-(aminoethyl)-γ-aminopropyltrimethoxysilane, n-β-(aminoethoxyl)-γ-aminopropyltrimethoxysilane, γ-chloropropyltrimethoxysilane, and silylating agents having the general formula

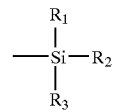

or an oligomer thereof, wherein $R_1$, $R_2$, and $R_3$ are independently selected from the group consisting of alkoxy, alkyl, alkenyl, cycloalkyl, aryl, aralkyl, and organofunctional moieties.

8. The process of claim 1 wherein the natural fiber is employed at a level in the range of from about 40 to about 70 weight % based on the weight of the total formulation.

9. A composite material prepared by a process consisting essentially of the steps of:

A) sizing a natural fiber with a reactive organosilane;
   B) mixing the sized natural fiber with a high density polyethylene resin; and
   C) adding a functionalized polyolefin coupling agent to the mixture of the sized natural fiber and the high density polyethylene resin to provide said composite material;

wherein the functionalized polyolefin coupling agent is selected from the group consisting of maleic anhydride modified polypropylenes having a weight average molecular weight in the range of from about 20,000 to about 300,000 and comprising from about 0.6 to 310 moles of maleic anhydride per mole of polymer and maleic anhydride modified high density polyethylenes having a weight average molecular weight in the range of from about 20,000 to about 300,000 and comprising from about 0.6 to 310 moles of maleic anhydride per mole of polymer.

10. The composite material of claim 9 wherein the natural fiber is selected from the group consisting of wood flour, wood fiber, and agricultural fiber.

11. The composite material of claim 10 wherein the natural fiber is selected from the group consisting of wood flour, wood fiber, hemp, flax, and kenaf.

12. The composite material of claim 9 wherein the natural fiber is employed at a level in the range of from about 20 to about 85 weight % based on the weight of the total formulation.

13. The composite material of claim 9 wherein the reactive organosilane is selected from the group consisting of aminosilanes, epoxysilanes, alkoxysilanes, methacrylic silanes, mercaptosilanes, chlorosilanes, and oligomers, mixtures, and blends thereof.

14. The composite material of claim 9 wherein the reactive organosilane is selected from the group consisting of γ-aminopropyltriethoxysilane, γ-methacryloxypropyl trimethoxysilane, propyl triethoxy silane, vinyltriethoxysilane, vinyltri(2-methoxy-ethoxy)silane, β-(3,4-epoxycyclohexyl)-ethyltrimethoxysilane, γ-glycidoxypropyltrimethoxysilane, γ-mercaptopropyltrimethoxysilane, n-β-(aminoethyl)-γ-aminopropyltrimethoxysilane, n-β-(aminoethoxyl)-γ-aminopropyltrimethoxysilane, γ-chloropropyltrimethoxysilane, and silylating agents having the general formula

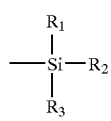

or an oligomer thereof, wherein $R_1$, $R_2$, and $R_3$ are independently selected from the group consisting of alkoxy, alkyl, alkenyl, cycloalkyl, aryl, aralkyl, and organofunctional moieties.

15. The composite material of claim 9 wherein the reactive organosilane is γ-aminopropyltriethoxysilane.

16. The composite material of claim 9 wherein the natural fiber is employed at a level in the range of from about 40 to about 70 weight % based on the weight of the total formulation.

* * * * *